(12) United States Patent
Cairns

(10) Patent No.: US 6,510,647 B2
(45) Date of Patent: Jan. 28, 2003

(54) ANIMAL TRAPPING APPARATUS AND METHOD

(76) Inventor: James L. Cairns, 403 S. Atlantic Ave., Ormond Beach, FL (US) 32176

(*) Notice: Subject to any disclaimer, the term of this patent is extended or adjusted under 35 U.S.C. 154(b) by 0 days.

(21) Appl. No.: 09/819,363

(22) Filed: Mar. 28, 2001

(65) Prior Publication Data

US 2002/0139039 A1 Oct. 3, 2002

(51) Int. Cl.$^7$ .................... A01M 23/04; A01M 23/12; A01M 23/00
(52) U.S. Cl. .................... 43/69; 43/60; 43/58
(58) Field of Search .................... 43/69, 71, 74, 43/61, 60, 63

(56) References Cited

U.S. PATENT DOCUMENTS

| | | | | |
|---|---|---|---|---|
| 107,532 A | * | 9/1870 | Percival et al. | 43/69 |
| 1,132,428 A | * | 3/1915 | Boswell | 43/60 |
| 2,655,759 A | * | 10/1953 | Cronberger | 43/60 |
| 2,885,820 A | * | 5/1959 | Maggio | 43/61 |
| 4,578,892 A | * | 4/1986 | Melton | 43/60 |
| 5,502,918 A | * | 4/1996 | Oviatt | 43/61 |
| 5,979,105 A | * | 11/1999 | Marks | 43/61 |

* cited by examiner

Primary Examiner—Charles T. Jordan
Assistant Examiner—Tara M Golba
(74) Attorney, Agent, or Firm—Brown, Martin, Haller & McClain, LLP

(57) ABSTRACT

A live animal trap includes only two basic parts, an elongate hollow tube and a pivot support stand on which the tube is pivotally mounted. The tube has a first, closed end for holding bait and a second, open end. The tube is pivotally mounted on the stand for rotation about a horizontal pivot axis transverse to the tube axis. The pivot axis is located closer to the first end of the tube than the second end. When the stand is placed on a support surface, the longer end of the tube will be slightly heavier, so that the second end of the tube will pivot downwardly into a set position in which the tube is inclined upwardly with the second end contacting the support surface. An animal can enter the open second end of the tube and move towards the bait. When the animal passes the pivot axis, the first end of the tube becomes heavier and pivots downwardly, moving the second end upwardly, until the tube reaches a vertical, actuated position with the animal trapped in the first, bottom end of the tube.

14 Claims, 1 Drawing Sheet

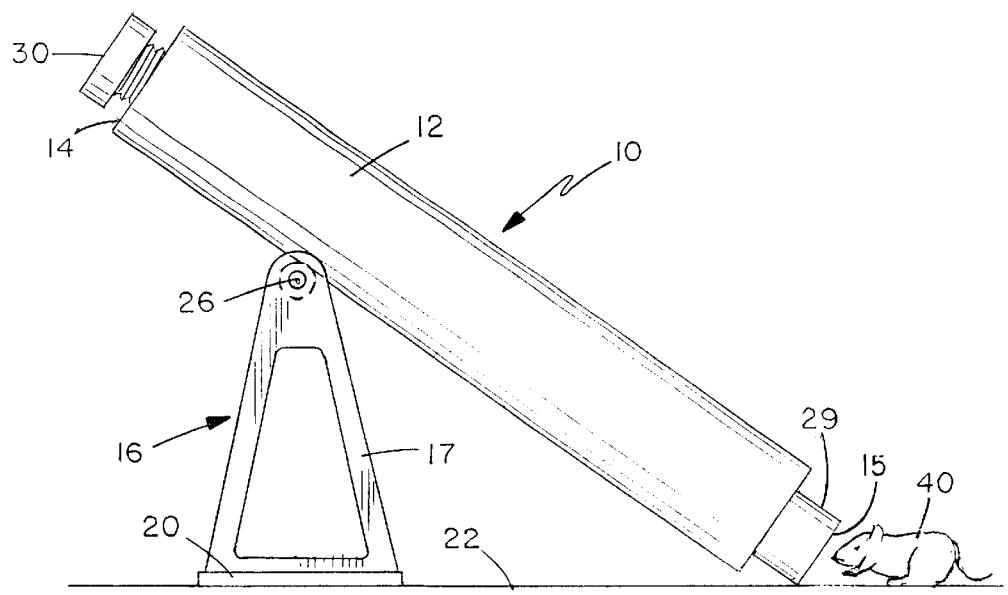
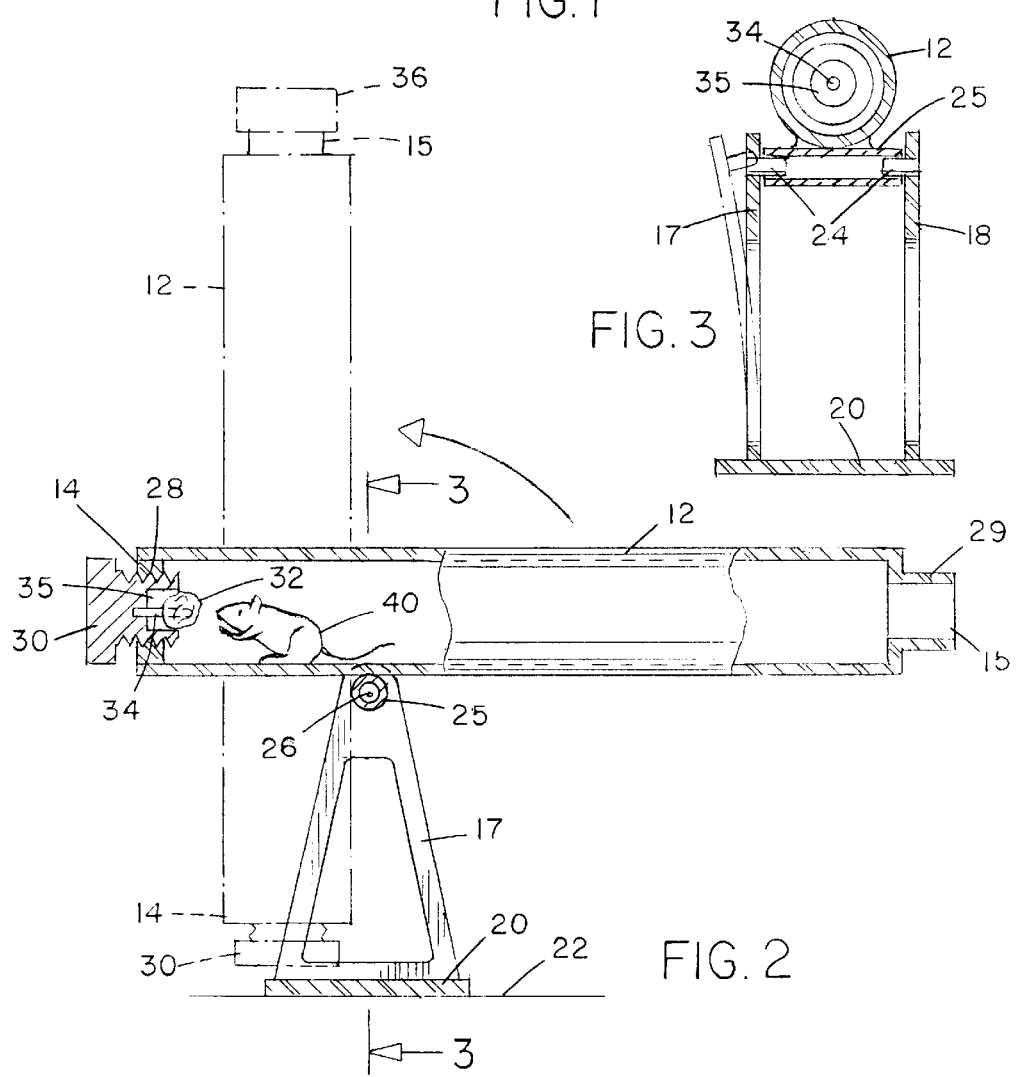

ANIMAL TRAPPING APPARATUS AND METHOD

BACKGROUND OF THE INVENTION

The present invention relates generally to animal trapping devices such as mouse traps and the like.

Mouse traps have been designed in many ways throughout the years. Conventionally, mouse traps include a spring-loaded member mounted on a base, the bar and the base forming jaws in which the bar can be moved from a cocked position to a released position when the mouse touches the trigger arm. For the most part, known animal traps all kill or otherwise harm the trapped animal. This is often the desired result. However, in some cases, animals are to be trapped and captured harmlessly for relocation or study purposes. Thus, many "live animal" traps have been designed for this purpose. Such traps often have disadvantages such as multiple moving parts or complexity, resulting in potential malfunction, trauma to the animals, difficulty in cost and cleaning, and expensive manufacture.

SUMMARY OF THE INVENTION

It is an object of the present invention to provide a new and improved live animal trap.

According to one aspect of the present invention, a live animal trap is provided, which comprises an elongate hollow tube having a first, closed end and a second, open end, a bait holding device in the first end of the tube, a pivot support member having a lower end for seating on a ground or other relatively flat surface and an upper end, a pivot device pivotally connecting the upper end of the support member to the tube at a location closer to the first end of the tube than the second end, the pivot device having a horizontal pivot axis transverse to the longitudinal axis of the tube, and dividing the tube into a first, shorter end portion on one side of the pivot axis and a second, longer end portion on the other side of the pivot axis, the second end portion being heavier than the first end portion whereby the tube has a set position in which it is inclined upwardly with the second end contacting the ground, and is pivotable between the set position and a generally upright trapping or actuated position in which the first end pivots downwardly and the second end pivots upwardly to trap an animal in the tube.

When the pivoted tube is placed on the ground or other surface, either inside a building or outside, and a suitable bait is placed into the first end of the tube, the heavier second end portion of the tube will tend to pivot downwardly to contact the ground, in a manner similar to a seesaw or teeter-totter. An animal, such as a mouse or rat, attracted by the bait, will enter the open second end of the tube and move upwardly towards the first end. When the animal passes the pivot point, the weight of the animal will cause the first end portion of the tube to pivot downwards, moving the tube into the upright, actuated position. The animal's weight will keep the closed first end of the tube downwards, and the animal will be unable to climb out of the tube since the tube wall will now be vertical. The animal is therefore effectively trapped, but is unharmed and has access to a food supply, in the form of the bait.

The apparatus may also include a ventilated lid for placing over the second end of the tube for transporting the animal inside the tube. The operator has no need to touch the animal or risk scratching or biting which may occur when the trap involves a wire cage.

In an exemplary embodiment of the invention, the first end of the tube has a threaded opening, and a counterweight member has a threaded stem for threaded engagement in the opening to close the first end of the tube. The counterweight member also has a holding device on its inner end for holding bait inside the first end of the tube. The position of the counterweight can be adjusted to balance the tube such that the second end just pivots downward to rest on a flat surface on which the apparatus is supported.

The pivot support member may comprise an upright frame having two spaced legs having aligned pivot pins projecting towards one another at their upper ends. The pivot device may comprise a pivot sleeve secured to the tube at a predetermined position closer to the first end, and extending transverse to the tube longitudinal axis, with the pivot pins extending into opposite ends of the sleeve to rotatably support the sleeve on the frame. Alternatively, a pivot pin on the tube may be pivotally engaged at its opposite ends in aligned indents or openings in the legs. The legs may have some flexibility to allow the tube to be removed from the base member when desired in order to transport a trapped animal to a different location or into a different enclosure.

According to another aspect of the present invention, a method of trapping an animal is provided, which comprises the steps of:

pivotally mounting a tube on a pivot support stand for pivotal movement of the tube about a horizontal pivot axis transverse to the tube axis, the pivot axis being closer to a first, closed end of the tube than a second, open end of the tube, the tube being pivotable between a first, set position in which the second end of the tube contacts a surface on which the support stand is placed and the tube is inclined upwardly towards the first end and a second, trapping or actuated position in which the tube is oriented substantially vertically with the first end at the bottom and the second end at the top;

securing bait in the first end of the tube, and orienting the tube in the set position whereby, when an animal is attracted to the bait, the animal can enter the second end of the tube, and ascend towards the first end, and the tube will pivot from the rest position to the actuated, trapping position when the animal passes the pivot axis due to the weight of the animal; and after an animal is trapped, transporting the tube containing the animal to another location for release or testing.

The animal trapping apparatus and method of the present invention allows animals such as mice or rats to be trapped easily, without harming the animal. The apparatus is simple and inexpensive, and easy to operate, and can be designed for trapping small or larger animals, by appropriate selection of the trap dimensions. After the animal is trapped in the tube, the tube can be readily used as a container for safely transporting the animal to a different location.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 1 is a side view of an animal trapping apparatus according to an exemplary embodiment of the invention in a set position;

FIG. 2 is a side view, partially cut away showing the trap being activated, the fully actuated position being indicated in broken line; and FIG. 3 is a sectional view taken on line 3—3 of FIG. 2.

DETAILED DESCRIPTION OF THE DRAWINGS

FIGS. 1 to 3 of the drawings illustrate an animal trap 10 according to an exemplary embodiment of the present invention. The trap 10 basically comprises an elongate, hollow tube 12 having a first, closed end 14 and a second, open end 15, and a pivot support stand or frame 16 on which the tube is pivotally mounted.

Pivot support frame 16 comprises a pair of spaced, generally triangular legs 17,18 extending upwardly from a flat base 20 designed for seating on the ground or other relatively flat surface 22, either indoors or outdoors. The frame 16 may be of plastic, metal or the like. Each leg has an inwardly directed pivot pin 24 adjacent its upper end. A pivot sleeve 25 is secured to the outside of tube 12 so as to extend in a tangential direction transverse to the longitudinal axis of the tube, as indicated in FIG. 3. As indicated in FIGS. 1 and 2, the sleeve 25 is located closer to the first end of the tube than the second end. The opposite, open ends of the sleeve 25 are rotatably engaged over the pivot pins 24, so that the tube is pivotable about pivot axis 26 between a set position as illustrated in FIG. 1, in which the second end of the tube contacts the surface 22, and an upright, actuated position as illustrated in dotted outline in FIG. 2. The legs 17,18 may have some flexibility to allow the tube to be removed from the support frame if desired, as indicated in FIG. 3.

As best illustrated in FIG. 2, tube 12 is a relatively thin walled plastic tube with a threaded port 28 at the first end, and a smaller diameter extension 29 at the second end. A threaded cap 30 engages in threaded port 28. Cap 30 comprises a counterweight for adding some weight to the first end of the tube. Additionally, a holder for removably holding bait 32 is provided at the inner end of cap 30. The bait holder comprises a spike 34 mounted in a cavity 35 at the inner end of the cap. The bait 32 is impaled on the spike and the cap is then secured in the threaded port 28, thereby holding the bait at the first end of the tube.

The trap is designed to be placed on a relatively flat surface, such as an outside ground surface or inside floor surface, in a location where an animal is to be trapped. The pivot sleeve 25 divides the tube 12 into a shorter, first end portion on one side of the pivot axis and a longer, second end portion on the opposite side of the pivot axis. The longer end portion will be slightly heavier than the first end portion, such that the second end of the tube will tend to pivot downwardly into the set position illustrated in FIG. 1, in which the tube is inclined upwardly at an angle of around 20° to 40° and the second end 15 contacts the surface 22. The counterweight or cap 30 may be adjusted inwardly or outwardly in order to balance the tube such that the end 15 just pivots downwards to rest on flat surface 22.

An animal, such as a mouse 40, attracted by the scent of bait 32, will enter the open end 15 of extension 29, and start to climb up along the tube towards the bait. The tilt angle is such that the animal can climb up the tube walls without slipping back down to the lower, second end of the tube. As illustrated in FIG. 2, once the animal passes the pivot axis 26, the tube will start to rotate in an anti-clockwise direction, as shown by the arrow, about axis 26, due to the weight of the animal which results in an increased weight at the first end of the tube. The tube will continue to rotate until it reaches the upright or vertical actuated position indicated in dotted outline in FIG. 2, in which the first end of the tube is at the bottom and the open, second end is at the top and the bottom of the first end of the tube is above the ground or support surface. The interior walls of the tube have a surface which is smooth enough to prevent the animal from climbing up out of the tube when the tube is vertical. The animal is therefore effectively trapped, but is unharmed and has a food A ventilated lid 36 may be provided for placing over the open end 15 of the tube, as indicated in dotted outline in FIG. 2, in order to transport the tube. The tube 12 is then unclipped from the support frame 16 by flexing the legs outwardly to release the pins 24 from sleeve 25, as indicated in FIG. 3. The tube can then be carried to another location for release of the animal or transfer to another container for testing purposes. The operator of the trap has no need to touch the animal in order to transport it, and there is no risk of biting or scratching which can occur with wire cage traps.

The animal trap of FIGS. 1 to 3 is of very simple construction and is easy to set up for trapping purposes. Once an animal is trapped, the tube can be closed by ventilated lid 36 in order to allow the animal to be safely transported. The trap can be cleaned easily after use, simply by removing the end cap 30 and rinsing out the inside of the tube. The interior surfaces of the tube are smooth, as mentioned above, so that they can be easily rinsed clean. The trap has only one moving part, the pivoted tube, and is inexpensive. It can be made in any suitable dimensions, depending on the size of the animal to be trapped, and may be designed in one size for small animals such as rats or mice, and in larger sizes for bigger animals such as skunks, raccoons, and the like. A suitably dimensioned trap may even be designed for harmless capture and transport of animals as large as bears.

The live animal trap of this invention is a significant improvement over the prior art, since it will minimize or eliminate any trauma to the animal, and also permits the animal to be safely and easily transported after capture. It is a low cost, relatively simple design, is easy to clean, and is extremely effective in trapping animals.

Although an exemplary embodiment of the invention has been described above by way of example only, it will be understood by those skilled in the field that modifications may be made to the disclosed embodiment without departing from the scope of the invention, which is defined by the appended claims.

I claim:

1. A live animal trap, comprising:
   an elongate hollow tube having a first, closed end and a second, open end;
   a bait holding device in the first end of the tube;
   a support frame having a lower end for seating on a support surface; and
   a pivot device pivotally connecting the support frame to the tube at a fixed location closer to the first end of the tube than the second end, the pivot device having a horizontal pivot axis transverse to the longitudinal axis of the tube, and dividing the tube into a first, shorter end portion on one side of the pivot axis and a second, longer end portion on the other side of the pivot axis, the second end portion being heavier than the first end portion;
   wherein the tube has a set position in which it is inclined upwardly with the second end contacting the support surface, and is pivotable between the set position and a generally upright, actuated position in which the first end pivots downwardly and the second end pivots upwardly to trap an animal in the tube;
   wherein the first end of the tube has an opening and a cap is releasably seated in the first end opening to close the opening;

wherein the cap has an inner end, and a bait holder is mounted at the inner end of the cap for holding bait in the first end of the tube;

wherein the inner end of the cap has a cavity having an end face, and the bait holder comprises a spike projecting from the end face of the cavity; and wherein the bottom of the closed end of the tube is spaced above the lower end of the support frame when the tube is in the actuated position.

2. The apparatus as claimed in claim 1, wherein the tube is inclined at an angle between 20° and 40° in the set position.

3. The apparatus as claimed in claim 1, wherein the tube is inclined at an angle of approximately 30° in the set position.

4. The apparatus as claimed in claim 1, wherein the pivot device includes a releasable fastener releasably connecting the tube to the support frame.

5. A live animal trap, comprising:

an elongate hollow tube having a first, closed end and a second, open end;

a bait holding device in the first end of the tube;

a ventilated lid for releasably engaging over the open second end of the tube;

a support frame having a lower end for seating on a support surface; and a pivot device pivotally connecting the support frame to the tube at a fixed point location closer to the first end of the tube than the second end, the pivot device having a horizontal pivot axis transverse to the longitudinal axis of the tube, and dividing the tube into a first, shorter end portion on one side of the pivot axis and a second, longer end portion on the other side of the pivot axis, the second end portion being heavier than the first end portion;

wherein the tube has a set position in which it is inclined upwardly with the second end contacting the support surface, and is pivotable between the set position and a generally upright, actuated position in which the first end pivots downwardly and the second end pivots upwardly to trap an animal in the tube;

wherein the first end of the tube has an opening and a cap is releasably seated in the first end opening to close the opening;

wherein the cap has an inner end, and a bait holder is mounted at the inner end of the cap for holding bait in the first end of the tube;

wherein the inner end of the cap has a cavity having an end face, and the bait holder comprises a spike projecting from the end face of the cavity; and wherein the bottom of the closed end of the tube is spaced above the lower end of the support frame when the tube is in the actuated position.

6. The apparatus as claimed in claim 1, wherein the opening is threaded and the cap has a threaded stem for threaded engagement in the opening, the threaded stem having a length greater than that of the opening for adjustment of the position of the cap in the opening.

7. The apparatus as claimed in claim 6, wherein the cap has a head comprising a counterweight for balancing the tube into the set position.

8. The apparatus as claimed in claim 1, wherein the tube has a smooth inner surface for preventing animals from climbing out of the tube when the tube is in the upright, actuated position.

9. The apparatus as claimed in claim 1, wherein the support frame comprises a flat base plate for engaging the support surface and a pair of spaced legs projecting upwardly from the base plate, and the pivot device comprises a pair of opposing pivot pins at the upper end of the legs and a pivot sleeve secured to the tube and oriented in a direction transverse to the tube longitudinal axis, the pivot pins being rotatably engaged in opposite ends of the sleeve.

10. The apparatus as claimed in claim 9, wherein at least one leg is a flexible member biased into a first position in which the pin engages in the pivot sleeve, and movable into a second position in which the pin is released from the sleeve to permit the tube to be removed from the support frame.

11. A method of trapping a live animal, comprising the steps of:

placing a lower end of a pivot support stand on a relatively flat support surface;

pivotally mounting a tube on the pivot support stand for pivotal movement of the tube about a horizontal pivot axis transverse to the tube axis, the pivot axis being closer to a first, closed end of the tube than a second, open end of the tube, the tube being pivotable between a first, set position in which the second end of the tube contacts the support surface and the tube is inclined upwardly towards the first end and a second, actuated position in which the tube is oriented substantially vertically with the first end at the bottom and the second end at the top and wherein the bottom of the closed end of the tube is spaced above the lower end of the support stand when the tube is in the actuated position;

securing bait in the first end of the tube, the first end of the tube having an opening and a cap having an inner end, and a bait holder mounted at the inner end of the cap for holding bait in the first end of the tube;

releasably seating the cap in the first end opening to close the opening, the cap having a cavity having an end face and the bait holder, the bait holder comprising a spike projecting from the end face of the cavity;

orienting the tube in the set position wherein, when an animal is attracted to the bait, the animal can enter the second end of the tube, and ascend towards the first end, and the tube will pivot from the set position to the actuated position when the animal passes the pivot axis due to the weight of the animal; and after an animal is trapped, transporting the tube containing the animal to another location for release or testing.

12. A method of trapping a live animal, comprising the steps of:

placing a lower end of a pivot support stand on a relatively flat support surface;

pivotally mounting a tube on the pivot support stand for pivotal movement of the tube about a horizontal pivot axis transverse to the tube axis, the pivot axis being closer to a first, closed end of the tube than a second, open end of the tube, the tube being pivotable between a first, set position in which the second end of the tube contacts the support surface and the tube is inclined upwardly towards the first end and a second, actuated position in which the tube is oriented substantially vertically with the first end at the bottom and the second end at the top and wherein the bottom of the closed end of the tube is spaced above the lower end of the support stand when the tube is in the actuated position;

securing bait in the first end of the tube, the first end of the tube having an opening and a cap having an inner end, and a bait holder mounted at the inner end of the cap for holding bait in the first end of the tube;

releasably seating the cap in the first end opening to close the opening, the cap having a cavity having an end face and the bait holder, the bait holder comprising a spike projecting from the end face of the cavity;

orienting the tube in the set position wherein, when an animal is attracted to the bait, the animal can enter the second end of the tube, and ascend towards the first end, and the tube will pivot from the set position to the actuated position when the animal passes the pivot axis due to the weight of the animal;

placing a ventilated lid over the open second end of the tube after an animal is trapped in the tube with the tube in the upright, actuated position and;

after an animal is trapped, transporting the tube containing the animal to another location for release or testing.

13. The method as claimed in claim 11, including the step of removing the tube from the support stand after an animal is trapped.

14. A live animal trap, comprising:

an elongate hollow tube having a first, closed end with a threaded port and a second, open end and wherein the first end of the tube has an opening and a threaded cap is releasably seated in the first end opening to close the opening and wherein the cap is engaged in the threaded port and comprises a counterweight for adding weight to the first, closed end of the tube;

a bait holding device in the threaded cap in the first end of the tube, where the cap has an inner end and the bait holder is mounted at the inner end of the cap and comprises a spike for holding bait in the first end of the tube;

a support frame having a lower end for seating on a support surface and a pair of triangular legs which extend upward from the lower end; and a pivot device pivotally connecting the support frame to the tube at a fixed point location closer to the first end of the tube than the second end, the pivot device having a horizontal pivot axis transverse to the longitudinal axis of the tube, and dividing the tube into a first, shorter end portion on one side of the pivot axis and a second, longer end portion on the other side of the pivot axis, the second end portion being heavier than the first end portion;

wherein the pivot device comprises a pair of opposing pivot pins at the upper end of the legs and a pivot sleeve secured to the tube and oriented in a direction transverse to the tube longitudinal axis, the pivot pins being rotably engaged in opposite ends of the sleeve and wherein at least one leg is a flexible member biased into a first position in which the pin engages in the pivot sleeve, and movable into a second position in which the pin is released from the sleeve to permit the tube to be removed from the support frame;

wherein the tube has a set position in which it is inclined upwardly at an angle of approximately 30° with the second end contacting the support surface, and is pivotable between the set position and a generally upright, actuated position in which the first end pivots downwardly and the second end pivots upwardly to trap an animal in the tube;

wherein the bottom of the closed end of the tube is spaced above the lower end of the support frame when the tube is in the actuated position;

wherein the tube has a smooth inner surface for preventing animals from climbing out of the tube when the tube is in the upright, actuated position;

wherein the cap has a threaded stem for threaded engagement in the opening, the threaded stem having a length greater than that of the opening for adjustment of the position of the cap in the opening; and wherein the inner end of the cap has a cavity having an end face, and the spike of the bait holder projects from the end face of the cavity.

* * * * *